(12) United States Patent
Alonso Vazquez et al.

(10) Patent No.: US 9,993,999 B2
(45) Date of Patent: Jun. 12, 2018

(54) LAMINATED WINDSHIELD WITH DEFINED BREAK PATH

(71) Applicant: FORD GLOBAL TECHNOLOGIES, LLC, Dearborn, MI (US)

(72) Inventors: Liliana Alonso Vazquez, Ciudad de Mexico (MX); Francisco Fernandez, Puebla (MX); Raul Ezequiel Alvarez Ruiz, Mexico DF (MX)

(73) Assignee: Ford Global Technologies, LLC, Dearborn, MI (US)

( * ) Notice: Subject to any disclaimer, the term of this patent is extended or adjusted under 35 U.S.C. 154(b) by 20 days.

(21) Appl. No.: 15/217,422

(22) Filed: Jul. 22, 2016

(65) Prior Publication Data

US 2018/0022069 A1    Jan. 25, 2018

(51) Int. Cl.
*B60J 1/02* (2006.01)
*B32B 17/10* (2006.01)

(52) U.S. Cl.
CPC ......... *B32B 17/10064* (2013.01); *B60J 1/02* (2013.01)

(58) Field of Classification Search
CPC ....................................................... B60J 1/02
See application file for complete search history.

(56) References Cited

U.S. PATENT DOCUMENTS

| | | | |
|---|---|---|---|
| 7,508,406 B2 | 3/2009 | Oehrlein | |
| 2004/0023039 A1 | 2/2004 | Schwamb et al. | |
| 2004/0209053 A1 | 10/2004 | Holtmann et al. | |
| 2013/0091779 A1 | 4/2013 | Dominique et al. | |
| 2013/0196091 A1 | 8/2013 | Wildenhain et al. | |

FOREIGN PATENT DOCUMENTS

GB    1221285 A    2/1971

*Primary Examiner* — Alexander Thomas
(74) *Attorney, Agent, or Firm* — Jason Rogers; King & Schickli, PLLC

(57) ABSTRACT

A laminated windshield includes an outer glass layer, an inner glass layer and an intermediate plastic layer or interlayer that prevents the windshield from shattering. The laminated windshield also includes a channel or break line engineered to break outward toward the outer glass layer thereby providing an emergency escape path from the interior of a motor vehicle.

16 Claims, 4 Drawing Sheets

LAMINATED WINDSHIELD WITH DEFINED BREAK PATH

TECHNICAL FIELD

This document relates generally to the motor vehicle equipment field and, more particularly, to a laminated windshield that incorporates a break line that defines a break path engineered to break outward toward the outer glass layer of the laminated windshield and thereby provide an emergency exit from the interior of the motor vehicle.

BACKGROUND

Engineering breakthroughs have significantly increased motor vehicle operating safety. One such engineering breakthrough includes the development of laminated glass windshields which incorporate an outer glass layer, an inner glass layer and an intermediate plastic layer or interlayer. That interlayer is typically a specially designed film that holds the glass together when the windshield is shattered in order to reduce the risk of glass-promoted injury.

While laminated glass provides a number of significant safety benefits, it should be appreciated that it can make it very difficult to escape from the interior of a motor vehicle when the doors of the vehicle have been rendered inoperable. This document relates to a laminated windshield that incorporates a break line engineered to break outward toward the outer glass layer thereby allowing one to actually break the laminated windshield in order to provide an emergency escape route from the motor vehicle. At the same time the laminated windshield still resists breaking inward thereby still providing high levels of protection to the motor vehicle occupants during motor vehicle operation.

SUMMARY

In accordance with the purposes and benefits described herein, a laminated windshield is provided. That laminated windshield comprises an outer glass layer, an inner glass layer and an intermediate plastic layer or interlayer. The laminated windshield further includes a break line engineered to break outward toward the outer glass layer.

That break line extends at least partially through the outer glass layer. In some possible embodiments, that break line extends completely through the outer glass layer to the intermediate interlayer. In other possible embodiments, that break line extends completely through the outer glass layer and at least partially through the intermediate interlayer. In still other possible embodiments, that break line extends completely through the outer glass layer and the intermediate interlayer to the inner glass layer.

In some embodiments the laminated windshield includes a top edge and a bottom edge and the break line extends from the top edge to the bottom edge.

The break line may comprise a channel. That channel may assume substantially any cross-sectional shape. In some embodiments, the channel is filled with a transparent filler. That transparent filler may be a soft plastic material of a type known in the prior art to be associated with laminated glass. Thus, for example, the transparent filler may be selected from a group of materials consisting of polyvinyl butyral, polycarbonate and mixtures thereof. In one possible embodiment, the channel is rectangular in cross-section.

In the following description, there are shown and described several preferred embodiments of the laminated windshield. As it should be realized, the laminated windshield is capable of other, different embodiments and its several details are capable of modification in various, obvious aspects all without departing from the windshield as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the laminated windshield and together with the description serve to explain certain principles thereof. In the drawing figures.

Reference will now be made in detail to the embodiment of the laminated windshield illustrated in the accompanying drawing figures.

DETAILED DESCRIPTION

Figure 1:
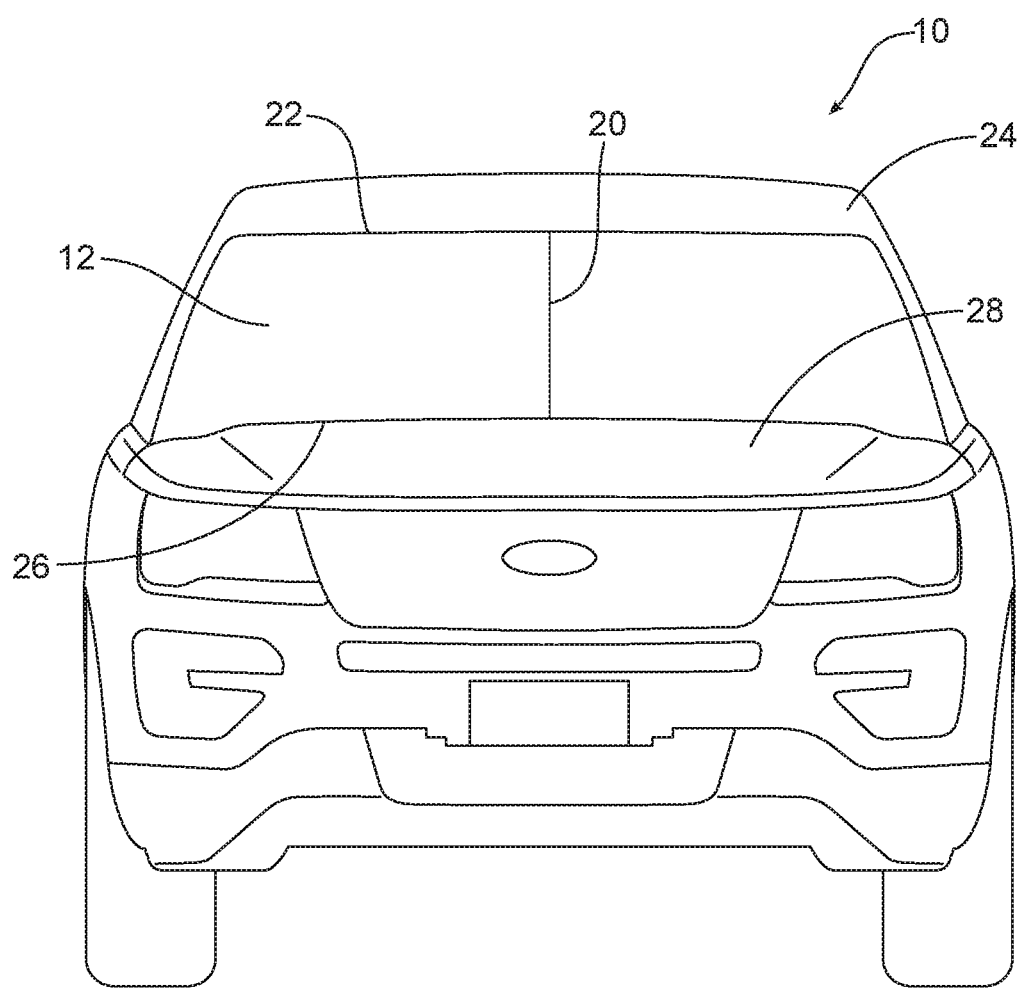
FIG. 1 is a front elevational view of a motor vehicle incorporating the laminated windshield that is the subject matter of this document.

Reference is now made to FIG. 1 illustrating a motor vehicle 10 equipped with the laminated windshield 12 that is the subject matter of this document.

Figure 2:
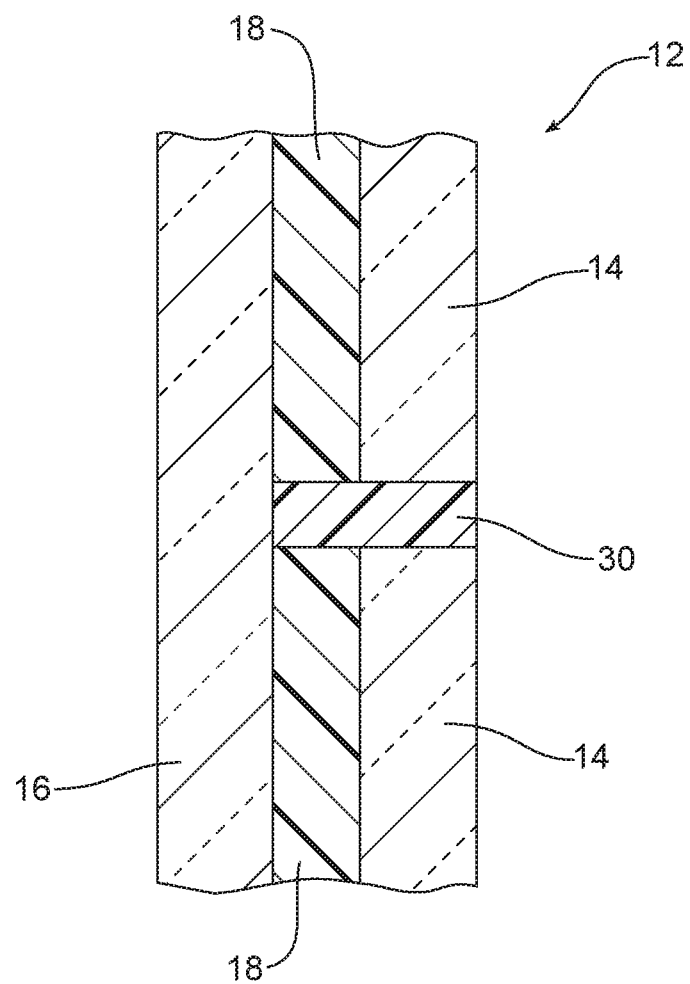
FIG. 2 is a detailed cross-sectional view of that laminated windshield clearly showing the outer glass layer, the inner glass layer and the intermediate plastic layer or interlayer of the laminated windshield as well as the break line formed in that windshield.

As best illustrated in FIG. 2, the laminated windshield 12 includes an outer glass layer 14, an inner glass layer 16 and an intermediate plastic layer or interlayer 18. The intermediate interlayer 18 may comprise a film of polyvinyl butyral (PVB) particularly adapted to hold the inner glass layer 16 and the outer glass layer 14 together in the event either glass layer is shattered due to an impact force such as may be incurred during a motor vehicle accident.

As clearly shown in FIG. 2, the laminated windshield 12 also includes a break line 20. In the illustrated embodiment, the break line 20 takes the form of a channel that is rectangular in cross section. Here it should be appreciated that the channel or break line 20 may assume a cross section of other appropriate shape so long as the channel or break line is engineered to break outward toward the outer glass layer 14 while providing greater resistance to breaking inward toward the inner glass layer 16. In the illustrated embodiment, the channel or break line 20 extends completely through the outer glass layer 14 and the intermediate interlayer 18 to the inner glass layer 16. Here, it should be appreciated that the channel or break line 20 may extend at least partially through the outer glass layer 14. Further, the channel or break line 20 may extend completely through the outer glass layer 14 to the intermediate interlayer 18. Still further, the channel or break line 20 may extend completely through the outer glass layer 14 and at least partially through the intermediate interlayer 18.

The channel or break line 20 may have a width of between about 0.1 mm and about 0.7 mm. Further, the ratio of the channel width to the channel depth may be between, for example, 3.0 and 30.0.

As illustrated in FIG. 1, the laminated windshield 12 includes a top edge 22 oriented toward the roof 24 of the motor vehicle 10 and a bottom edge 26 oriented toward the hood 28 of the motor vehicle. In the illustrated embodiment, the channel or break line 20 extends from the top edge 22 to the bottom edge 26 across the middle of the laminated windshield 12. Here it should be appreciated that the channel or break line 20 may be provided in the laminated windshield 12 at any desired location to meet the needs of any particular application and the design of any particular motor vehicle 10. Thus, the position of the channel or break line 20 across the laminated windshield 12 may be altered from that illustrated in FIG. 1. Further, for some applications, more than one channel or break line 20 may be provided. Where multiple channels or break lines are provided, they may be connected or separated.

Referring back to FIG. 2, the channel or break line 20 may include a transparent filler 30 which completely fills the break line so as to be flush with the outer surface of the outer glass layer 14. The transparent filler 30 may be a soft plastic material of a type known to be utilized with laminated glass. Thus, the transparent filler 30 may be selected from a group of materials consisting of, but not necessarily limited to, polyvinyl butyral, polycarbonate and mixtures thereof. As should be appreciated, the transparent filler 30 makes the channel or break line 20 virtually invisible to the eye, provides the laminated windshield 12 with a smooth outer surface to the touch and prevents dirt and debris from collecting in the channel or break line 20.

Figure 3:
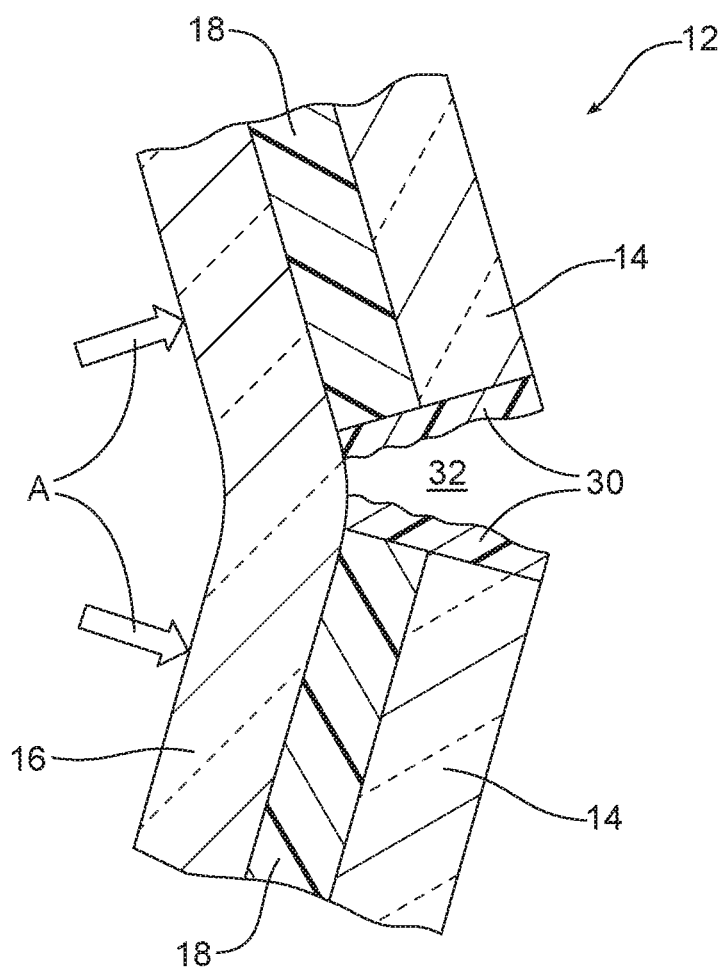
FIG. 3 illustrates how the windshield of FIG. 2 is engineered to break outwardly when a pushing force is applied to the inner glass layer from the inside or passenger compartment of the motor vehicle. The view is exaggerated for illustrative purposes.

Reference is now made to FIG. 3 which illustrates how the laminated windshield 12 breaks freely along a break path defined by the channel or break line 20 when a pushing force is applied to the inner glass layer 16 from an interior of the motor vehicle (note action arrows A). As should be appreciated, a clean break is provided in the transparent filler 30 provided along the channel or break line 20. That break is illustrated by reference numeral 32. As should be appreciated, the break 32 will promote a break in the inner glass layer 16 along the same line.

Figure 4:
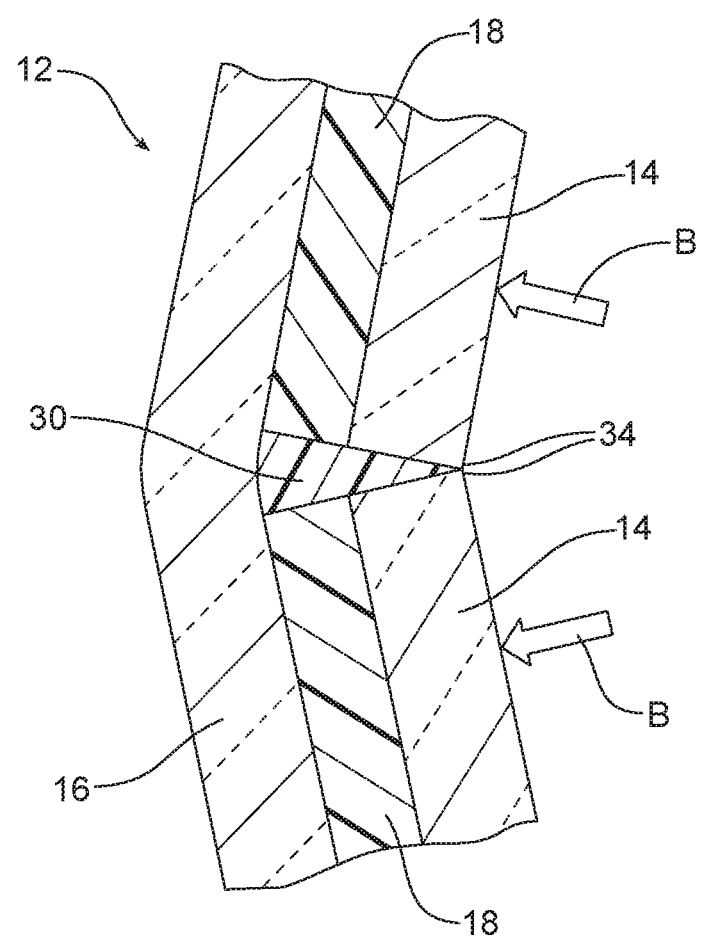
FIG. 4 illustrates how the laminated windshield of FIGS. 2 and 3 resists breaking inward. This view is also exaggerated for illustrative purposes.

Reference is now made to FIG. 4 illustrating how the laminated windshield 12 resists breaking inward toward the inner glass layer 16 when a pushing force is applied to the outer glass layer 14 (note action arrows B). More specifically, as illustrated in FIG. 4, as the laminated windshield 12 is pushed inward, the opposed outer edges 34 of the outer glass layer 14 defining the thickness of the channel or break line 20 converge and meet. Upon meeting they resist further inward movement of the laminated windshield and act in concert with the inner glass layer 16 to resist breaking inward.

As should be appreciated, FIGS. 3 and 4 are exaggerated for illustration purposes. However, FIGS. 3 and 4 clearly illustrate that the laminated windshield 12 is engineered to break outward toward the outer glass layer 14. By that, it is meant that the laminated windshield 12 is less resistant to breaking outward toward the outer glass layer 14 than it is resistant to breaking inward toward the inner glass layer 16. Thus, it should be appreciated that the laminated windshield 12 is engineered to be broken from the interior of the motor vehicle and provide an emergency escape pathway from the interior of the motor vehicle should such a pathway be needed by the motor vehicle occupants due to the motor vehicle doors being jammed shut or otherwise prevented from opening as a result of a motor vehicle accident. At the same time, the laminated windshield 12 effectively provides the full benefit of the safety glass of the laminated windshield to prevent breaking of the windshield inward toward the motor vehicle occupants.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A laminated windshield, comprising:
an outer glass layer;
an inner glass layer; and
an intermediate interlayer wherein said outer glass layer and said intermediate interlayer include a break line engineered to break outward toward said outer glass layer.

2. The laminated windshield of claim 1, including a top edge and a bottom edge, said break line extending from said top edge to said bottom edge.

3. The laminated windshield of claim 2, wherein said break line comprises a channel in said outer glass layer and said intermediate interlayer.

4. The laminated windshield of claim 3, further including a transparent filler in said channel.

5. The laminated windshield of claim 4, wherein said transparent filler is a plastic material.

6. The laminated windshield of claim 4, wherein said transparent filler is selected from a group consisting of polyvinyl butyral, polycarbonate and mixtures thereof.

7. The laminated windshield of claim 4, wherein said channel has a width of between 0.1 mm and 0.7 mm.

8. The laminated windshield of claim 1, wherein said break line comprises a channel in said outer glass layer and said intermediate interlayer.

9. The laminated windshield of claim 8, further including a transparent filler in said channel.

10. The laminated windshield of claim 9, wherein said transparent filler is a soft plastic material.

11. The laminated windshield of claim 9, wherein said transparent filler is selected from a group consisting of polyvinyl butyral, polycarbonate and mixtures thereof.

12. The laminated windshield of claim 9, wherein said channel has a width of between 0.1 mm and 0.7 mm.

13. A laminated windshield, comprising:
an outer glass layer;
an inner glass layer; and
an intermediate interlayer wherein a break line extends at least partially through said outer glass layer, said break line being a channel engineered to break outward toward said outer glass layer, and said channel being filled with a transparent filler.

14. The laminated windshield of claim 13, wherein said break line extends completely through said outer glass layer to said intermediate interlayer.

15. The laminated windshield of claim 13, wherein said break line extends completely through said outer glass layer and at least partially through said intermediate interlayer.

16. The laminated windshield of claim 13, wherein said break line extends completely through said outer glass layer and said intermediate interlayer to said inner glass layer.

* * * * *